March 26, 1929. A. PFAU 1,706,812
PRIME MOVER CONTROL SYSTEM
Filed March 28, 1925
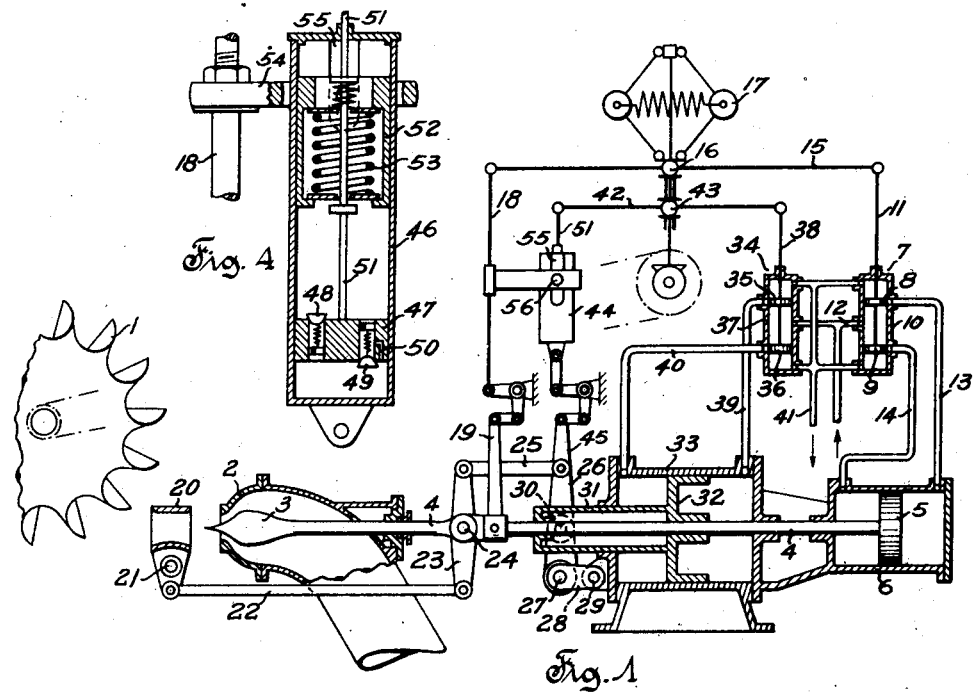
Fig. 4
Fig. 1
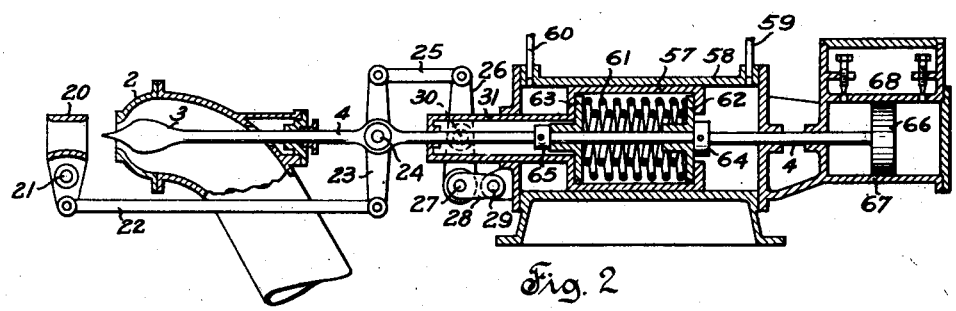
Fig. 2
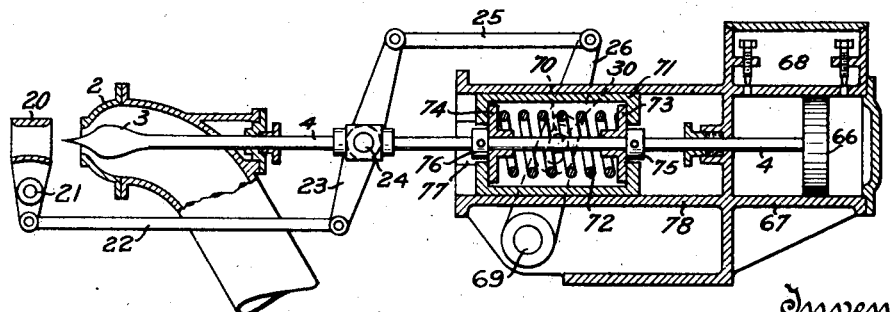
Fig. 3
Inventor
A. Pfau
by
Attorney Patented Mar. 26, 1929.

1,706,812

UNITED STATES PATENT OFFICE.

ARNOLD PFAU, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

PRIME-MOVER-CONTROL SYSTEM.

Application filed March 28, 1925. Serial No. 18,955.

This invention relates to prime mover control systems. It is particularly applicable to the control of impulse water wheels.

One of the objects of the invention is to provide a control system in which the speed of the prime mover and the supply of operating fluid thereto will be properly controlled.

The speed of and water supply to impulse wheels have been controlled by providing the nozzle or the pipe leading thereto with a proper regulator which acts to prevent undue pressure rise in the pipe when the needle of the nozzle is operated rapidly toward closed position. The pressure regulator does not act when the needle is moved sufficiently slowly toward closed position. This method of control has the disadvantage that the flow in the nozzle pipe down stream of the pressure regulator connection must at times be stopped entirely. If the pressure regulator fails the pipe line is apt to be wrecked due to excessive pressure rise. It is another object of the invention to obviate these disadvantages.

A further object of the invention is to provide a system of control which causes no sudden deceleration of the water anywhere in the pipe line.

Another object is the provision of a system of control in which the quantity of flow of the operating fluid is changed slowly whereas the direction of that flow may be changed rapidly.

Still another object is the provision of automatic means whereby when the change in direction of flow is no longer necessary, the direction of flow is brought back to normal. Other objects will appear hereinafter as the description of the invention proceeds.

The novel features of the invention will appear from this specification and the accompanying drawings forming a part thereof showing several embodiments of the invention and all these novel features are intended to be pointed out in the claims.

In the drawings:

Fig. 1 is a diagrammatic showing of one form of the invention as it may be applied in connection with an impulse wheel.

Fig. 2 is a more or less diagrammatic view of the invention in modified form.

Fig. 3 is a more or less diagrammatic view of a still further modification of the invention.

Fig. 4 is a view of a detail of Fig. 1.

Referring now to Fig. 1 there is here shown an impulse wheel runner 1 against which a stream may be directed from a nozzle 2 provided with a needle 3 which may be used to regulate the quantity of water flowing from the nozzle in the usual manner. The needle 3 may be operated by means of a rod 4 to one end of which is connected a servo-motor including a piston 5 operating in a cylinder 6. Fluid under pressure may be admitted so as to act on either side of piston 5 and the admission of this fluid may be controlled by means of a regulating valve 7 here shown as provided with a pair of piston valves 8, 9 operating in a cylinder 10. The valves 8, 9 may be operated by means of a stem 11. The valves are here shown in their neutral position in which they prevent the entrance of fluid under pressure through an inlet pipe 12 to either of a pair of pipes 13, 14 connected with the respective ends of cylinder 6. The valve stem 11 is here shown as connected to one end of a floating lever 15 provided with a floating pivot 16 the position of which may be controlled by a fly ball mechanism 17 or other suitable speed responsive means. The fly ball mechanism 17 may be driven from the impulse wheel 1 through any suitable connection, here indicated as belted.

The motion produced by the fly ball mechanism on regulating valve 7 may be compensated by means of any suitable connection to the servo-motor piston 5, here shown as a rod 18 pivotally connected to the other end of floating lever 15 and suitably connected through desired links and levers to a projection 19 rigidly secured to rod 4. This connection is such that motion of rod 4 to the left will cause the rod 18 to move upwardly as viewed in this figure.

Associated with nozzle 2 is here shown a deflecting hood 20 adapted to be swung on a pivot 21 by means of a rod 22 in turn pivotally connected to a lever 23. The lever 23 is pivoted at 24, intermediate its ends, on the rod 4. The other end of lever 23 is pivotally connected by means of a link 25 to one end of a lever 26 the other end of which is pivoted at 27 to a link 28 in turn swingable about a stationary pivot 29. The lever 26 is pivoted intermediate its ends on a pivot pin 30 mounted on a piston rod 31, in this instance of hollow form, to which is connected a piston 32 operating in a cylinder 33. Fluid under pressure may be admitted to either side of piston 32 by means of a regulating valve 34 here shown as provided with piston valves 35, 36 operating in a cylinder 37. The valves 35, 36 may be operated by means of a stem 38. The valves 35, 36 are shown in their neutral position in which fluid under pressure from pipe 12 would enter neither of a pair of pipes 39, 40 leading to the respective ends of cylinder 33. Both regulating valves 7, 34 may be connected from the ends of the cylinders of these valves to a usual drain pipe 41. The valve stem 38 is here shown as connected to one end of a floating lever 42 provided with a floating pivot 43 which may be controlled if desired by the same fly ball mechanism 17 which controls the floating lever 15.

The motion of valve stem 38 caused by the fly ball mechanism may be compensated by a connection between the floating lever 42 and the servo-motor piston 32. This connection is here shown as including a compensating device 44 one end of which is connected through a rod 51 to the other end of floating lever 42, and the other end of which may be suitably connected by links and levers to a projection 45 on the lever 26. The compensating connection is such that counter-clockwise movement of projection 45 will tend to produce upward movement of the rod 51. The compensating device 44 may be of the form shown in the patent to Englesson 1,126,433, January 26, 1915.

The compensating device 44 has been shown in section in Fig. 4, in more or less diagrammatic form in order to more clearly bring out its relation with respect to the system of Fig. 1. This compensating device is here shown as including a dash pot 46 in which a piston 47 operates, the piston being provided with valves 48, 49 on opposite sides thereof and designed to open up at definite pressures when the piston moves relatively to the dash pot in either one or the other direction. The pressures at which valves 48, 49 open may be adjusted and made suitable to the mode of compensation desired in any particular installation. The bypass 50 is also provided to permit of a slight passage of fluid within the dash pot from one side to the other of the piston. The piston is provided with a piston rod 51 passing through a spring cage 52. The spring cage 52 contains a spring 53 which is adapted to be compressed when the rod 51 moves with respect thereto in either direction a predetermined amount. The spring cage is connected to a member 54 which is in turn rigidly mounted on the rod 18. The connection between the member 54 and the spring cage is by means of a pin 56 carried by member 54, which pin passes through a slot 55 in dash pot 46.

The operation of the system of Fig. 1 is as follows. Assuming the parts to be in the position shown in Fig. 1 and wheel 1 operating, and that a definite fraction of the load on the wheel is removed thus causing the speed to rise or tend to rise, the fly ball mechanism 17 will raise the right hand ends of both floating levers 15, 42. The regulating valve 7 will cause admission of fluid under pressure to cylinder 6, so that the piston 5 will slowly move the needle 3 toward closed position. This slow motion of the piston 5 may be secured by properly predetermining the possible lift of the regulating valve 7 or the size of its ports or in any other desired manner. At the same time valve stem 38 is lifted and fluid under pressure is admitted to cylinder 33 so as to move piston 32 toward the left. The movement of piston 32 has no effect on the rod 4 as the latter passes freely through the piston but it does move the pivot pin 30 so as to rock lever 26 in a counter-clockwise direction and therefore as will be obvious it rocks lever 23 and the deflecting hood 20 in the same direction. The valve lift of regulating valve 34 is preferably such that, in conjunction with the area of piston 32 etc., the motion of deflecting hood 20 is relatively fast in its effect of bringing the stream from the nozzle 2 out of its normal direction, that is, away from its normal position of impact on the buckets of wheel 1. The counter-clockwise motion of lever 26 also reacts on the compensating device 44 and this motion tends to return the regulating valve 34 to its neutral position as does also a reduction in speed of the wheel 1 through the agency of the fly ball mechanism 17. By reason however of the construction and action of the compensating device 44 this compensating action may be said to be a "coarse" one. Meanwhile as the needle 3 slowly moves toward closed position an amount such as may be necesary to take care of the decreased load on wheel 1, the regulating valve 7 is at all times under control of the compensating connection 18 and this compensation may be said to be a "fine" one so that as previously stated the needle 3 will move slowly, and respond to correct slight speed changes. As the compensating connection 18 moves upwardly as viewed in the figure by reason of the motion of rod 4 toward the left the member 54 also moves upwardly and removes a predetermined amount of restraint from the upper end of spring 53. This action changes the adjustment of compensating device 44 to a "fine" one. At the same time, as rod 4 moves toward the left it also moves along with it the pivot 24, and lever 23 is therefore rocked in a clockwise direction about its pivotal connection with link 25 so that the deflecting hood 20 will be returned to its normal position as shown in Fig. 1. The connection between the deflector 20 and the needle is therefore such that when the needle has finally attained the position which produces a jet equivalent to the new load, the deflector is in such a position that no water is deflected.

It will be obvious that it is not necessary that the servo-motors for operating the deflecting hood and the needle be in axial alinement as indicated in Fig. 1 but that they be placed side by side or above one another or in any desired relation so long as they serve to produce the desired motions of the needle and deflecting hood.

Referring now to Fig. 2 this shows the invention in somewhat modified form, one of the servo-motors being eliminated. The parts in this figure which are the same or similar as the parts of Fig. 1 have been given the same reference numerals. A piston 57 is adapted to operate in a cylinder 58 and fluid under pressure may be admitted to either side of piston 57 through a pair of pipes 59, 60. The admission of fluid under pressure to these pipes may be controlled by a regulating valve in a manner similar to that described in connection with Fig. 1. The regulating valve may also be controlled by speed responsive means and if desired, by a compensating connection. In this particular case there would of course be but one regulating valve, one floating lever, and one compensating connection which might be of the form as in the patent to Englesson hereinabove referred to. The piston 57 is constructed to form a spring cage for a spring 61 acting against a pair of plates 62, 63 disposed at opposite ends of the spring. The plates 62, 63 are adapted to slide on the rod 4 passing therethrough. The rod 4 is provided with a pair of collars 64, 65 fastened thereto which are adapted to engage the plates 62, 63 respectively depending upon the direction of motion of piston 57. To one end of rod 4 is attached a piston 66 operating in a dash pot 67 which is here shown as provided with an adjustable by-pass 68 so that the retarding effect of the dash pot may be varied.

The operation of the device of Fig. 2 is as follows. Assuming the parts to be in the position shown in the figure and that a predetermined amount of load is removed from the wheel, fluid under pressure will be admitted to pipe 59 thereby moving piston 57 toward the left. The spring 61 will be compressed by reason of the motion of plate 62 toward the left and the rod 4 will remain relatively stationary by reason of the retarding effect produced by dash pot 67. The motion of piston 57 to the left will cause a counter-clockwise swing of deflector 20 in the same manner as described in connection with Fig. 1. Inasmuch, however, as the compression of spring 61 causes a force to be applied through plate 63 to collar 65 tending to move the latter and the rod 4 toward the left under the restraining action of dash pot 67, the rod 4 will slowly move the needle 3 toward the closed position a predetermined amount as determined by the reduction in the amount of load on the wheel or the speed rise. As the rod 4 moves toward the left the lever 23 will be rocked so as to return the deflector 20 to its normal position as also described in connection with Fig. 1.

Referring to Fig. 3 this shows a simplified modification in which no servo-motors are shown but may be applied, as will appear hereinafter, if desired. As in Fig. 2, the parts which are the same or similar to those of Fig. 1 have been given the same reference numerals. The lever 26 corresponding to the similar part in Figs. 1 and 2 is, in Fig. 3, mounted to swing about a stationary pivot 69. Instead of a servo-motor piston being connected to the lever 26 the element is in this case a spring cage 71 adapted to slide in a guide 78. This guide 78 is provided with a slot 77 to provide for movement and passage of the connection between the lever 26 and the spring cage 71, which may consist of a pin 30 carried by the spring cage and adapted to operate in a slot 70 in lever 26. The spring cage contains a spring 72 acting at opposite ends against plates 73, 74 which are adapted to slide with respect to the rod 4 passing therethrough. The rod 4 is provided with a pair of collars 75, 76 fastened thereto adapted to engage the plates 73, 74 respectively.

The operation of the device shown in Fig. 3 is as follows. Assuming that power is applied to the pivot or shaft 69 in any suitable manner (as by a servo-motor embodied in a governor of standard form) so as to rotate the lever 26 in a counter-clockwise direction, the spring cage 71 will be moved toward the left, the spring 72 being compressed by plate 73 by reason of the fact that the rod 4 is restrained by means of dash pot 67 as in Fig. 2. The motion of lever 26 causes deflection of the stream as described in connection with Fig. 1 and as spring 72 expands against plate 74 and collar 76, rod 4 will be moved toward the left to move needle 3 toward the closed position a predetermined amount. At the same time the motion of pivot 24 will cause the deflector 20 to be returned to its normal position.

It should be understood that it is not desired to limit the invention to the exact details of construction shown and described, for obvious modifications may occur to persons skilled in the art.

It is claimed and desired to secure by Letters Patent:

1. In combination with a nozzle for directing a stream against an impulse wheel, means whereby said stream may be directed away from its normal direction, a needle for said nozzle, and means including a mechanical connection between said needle and said stream directing means whereby a predetermined movement of said needle brings said stream back to its normal direction.

2. In combination with a nozzle for directing a stream against an impulse wheel, means for deflecting said stream, means for moving said deflecting means in one direction, a needle for said nozzle, and means including a mechanical connection between said needle and said stream deflecting means whereby movement of said needle moves said deflecting means in the opposite direction.

3. In combination with a nozzle for directing a stream against an impulse wheel, means including a servo-motor whereby said stream may be directed away from its normal direction, a needle for said nozzle, and means including a mechanical connection between said needle and said stream directing means whereby a predetermined movement of said needle brings said stream back to its normal direction.

4. In combination with a nozzle for directing a stream against an impulse wheel, means for deflecting said streams, means including a servo-motor for moving said deflecting means in one direction, a needle for said nozzle, and means including a mechanical connection between said needle and said stream deflecting means whereby movement of said needle moves said deflecting means in the opposite direction.

5. In combination, an impulse wheel, a nozzle for directing a stream against said wheel, means including a servo-motor whereby said stream may be directed away from its normal direction, means responsive to the speed of said wheel for controlling said servo-motor, a needle for said nozzle, and means including a mechanical connection between said needle and said stream directing means whereby a predetermined movement of said needle brings said stream back to its normal direction.

6. In combination, an impulse wheel, a nozzle for directing a stream against said wheel, means for deflecting said stream, means including a servo-motor for moving said deflecting means in one direction, means responsive to the speed of said wheel for controlling said servo-motor, a needle for said nozzle, and means including a mechanical connection between said needle and said stream deflecting means whereby movement of said needle moves said deflecting means in the opposite direction.

7. In combination with a nozzle for directing a stream against an impulse wheel, means whereby said stream may be directed away from its normal direction, a needle for said nozzle, and means including a mechanical connection between said needle and said stream directing means for controlling the movement of said directing means and said needle and for causing the effect of said directing means to be faster than that of said needle.

8. In combination with a nozzle for directing a stream against an impulse wheel, means whereby said stream may be directed away from its normal direction, a needle for said nozzle, means for operating said needle, a lever pivoted between its ends to said operating means, means for operatively relating one end of said lever with said directing means, and means for moving the other end of said lever.

9. In combination with a nozzle for directing a stream against an impulse wheel, means whereby said stream may be directed away from its normal direction, a servo-motor including a regulating valve for operating said directing means, a compensating connection including a dash pot between said regulating valve and said servo-motor, a needle for said nozzle, a second servo-motor including a regulating valve for operating said needle, and a direct compensating connection between said second servo-motor and its regulating valve.

10. In combination with a nozzle for directing a stream against an impulse wheel, means whereby said stream may be directed away from its normal direction, a servo-motor for operating said directing means, means responsive to the speed of said wheel for controlling said servo-motor to move a predetermined amount for a given speed change, a needle for said nozzle, a second servo-motor for operating said needle, means for controlling said second servo-motor to operate at a predetermined rate, and means whereby movement of said second servo-motor changes the predetermined amount of movement of said first servo-motor for a given speed change.

11. In combination with an impulse wheel, a nozzle for directing a stream against said wheel, means whereby said stream may be directed away from its normal direction, a servo-motor for operating said directing means, a regulating valve for said servo-motor, means responsive to the speed of said wheel for controlling said regulating valve, means responsive to the movement of said servo-motor for compensating the movement of said regulating valve, a needle for said nozzle, a second servo-motor for operating said needle, a regulating valve responsive to said speed responsive means for controlling said second servo-motor, and means responsive to the movement of said second servo-motor for compensating the movement of said second regulating valve.

12. In combination with an impulse wheel, a nozzle for directing a stream against said wheel, means whereby said stream may be directed away from its normal direction, a servo-motor for operating said directing means, a regulating valve for said servo-motor, means responsive to the speed of said wheel for controlling said regulating valve, means responsive to the movement of said servo-motor for compensating the movement of said regulating valve, a needle for said nozzle, a second servo-motor for operating said needle, a regulating valve responsive to said speed responsive means for controlling said second servo-motor, means responsive to the movement of said second servo-motor for compensating the movement of said second regulating valve, and means responsive to the movement of said second servo-motor for controlling said first named compensating means.

13. In combination with an impulse wheel, a nozzle for directing a stream against said wheel, means whereby said stream may be directed away from its normal direction, a servo-motor for operating said directing means, a regulating valve for said servo-motor, a floating lever operatively connected to said regulating valve, means responsive to the speed of said wheel for controlling said floating lever, means responsive to the movement of said servo-motor for controlling said floating lever, a needle for said nozzle, a second servo-motor for operating said needle, a second regulating valve for said second servo-motor, a second floating lever operatively connected to said second regulating valve and to said speed responsive means, and means responsive to the movement of said second servo-motor for controlling said second floating lever.

14. In combination with an impulse wheel, means for directing a stream against said wheel, means whereby said stream may be directed away from its normal direction, a servo-motor for operating said directing means, a regulating valve for said servo-motor, a floating lever operatively connected to said regulating valve, means responsive to the speed of said wheel for controlling said floating lever, means connected between said servo-motor and said floating lever for compensating the movement of said regulating valve including a dash pot interposed in said connection and a spring for restraining the piston of said dash pot, means for varying the quantity of fluid in said stream, a second servo-motor for operating said varying means, a regulating valve for said second servo-motor, a second floating lever operatively connected to said second regulating valve and to said speed responsive means, a connection between said second servo-motor and said second floating lever, and means whereby said connection varies the restraining action of said spring.

15. In combination with a nozzle for directing a stream against an impulse wheel, means whereby said stream may be directed away from its normal direction, a servo-motor including a regulating valve for operating said directing means, a compensating connection adjusted for coarse compensating action between said regulating valve and said servo-motor, a needle for said nozzle, and means responsive to the movement of said needle for readjusting said compensating connection for fine compensating action.

16. In combination with a nozzle for directing a stream against an impulse wheel, means whereby said stream may be directed away from its normal direction, a servo-motor including a regulating valve for operating said directing means, a compensating connection including a dash pot between said regulating valve and said servo-motor, a needle for said nozzle, a spring for restraining that part of the dash pot connected to said regulating valve, a needle for said nozzle, and means responsive to the movement of said needle for varying the restraining action of said spring.

17. In combination with a nozzle for directing a stream against an impulse wheel, means whereby said stream may be directed away from its normal direction, a servo-motor for operating said directing means, means responsive to the speed of said wheel for controlling said servo-motor to tend to regulate within a predetermined speed variation, a needle for said nozzle, a second servo-motor for operating said needle, means for controlling said second servo-motor to operate at a predetermined rate, and means whereby movement of said second servo-motor causes said first servo-motor to tend to regulate within a smaller predetermined speed variation.

18. In combination with a nozzle for directing a stream against an impulse wheel, means whereby said stream may be directed away from its normal direction, a needle for said nozzle, means including linkage between said needle and said stream directing means, said linkage being provided with a primary and a secondary point for the application of external forces such that the application of a predetermined force to said primary point causes said stream directing means to move in the direction which causes the stream to be directed away from normal and the application of a predetermined force to said secondary point causes said needle to reduce the size of said stream and movement of said needle so produced causes movement through said linkage of said stream directing means in a direction opposite from the aforesaid direction.

19. In combination with a nozzle for directing a stream against an impulse wheel, means whereby said stream may be directed away from its normal direction, a needle for said nozzle, means for operating said needle, a lever pivotally associated with said needle operating means, means for operatively relating a portion of said lever with said directing means, and means movable in a predetermined direction related to another portion of said lever for moving the same to cause said stream directing means to direct said stream away from normal, said predetermined direction of movement being the same as that necessary for moving said needle toward the closed position.

In testimony whereof, the signature of the inventor is affixed hereto.

ARNOLD PFAU.